United States Patent [19]
Watanabe et al.

[11] Patent Number: 6,134,016
[45] Date of Patent: *Oct. 17, 2000

[54] CHARACTER INFORMATION PRINTING APPARATUS

[75] Inventors: Kenji Watanabe; Takanobu Kameda; Tomoyuki Shimmura; Chieko Aida, all of Tokyo; Hiroyasu Kurashina; Takeshi Hosokawa, both of Suwa, all of Japan

[73] Assignees: King Jim Co., Ltd.; Seiko Epson Corporation, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/911,009

[22] Filed: Aug. 14, 1997

[30] Foreign Application Priority Data

Aug. 20, 1996 [JP] Japan ..................................... 8-218352

[51] Int. Cl.[7] ............................ G06T 15/00; G05B 11/00
[52] U.S. Cl. ......................... 358/1.1; 358/1.18; 358/1.13
[58] Field of Search .................................... 395/101–117; 358/256, 257, 280, 288, 451, 450, 1.11, 1.12, 1.9, 1.1, 1.18, 1.17; 345/127–131

[56] References Cited

U.S. PATENT DOCUMENTS

| 5,023,728 | 6/1991 | Nimura et al. | 358/437 |
|---|---|---|---|
| 5,121,468 | 6/1992 | Daino | 395/102 |
| 5,311,259 | 5/1994 | Moriya et al. | 355/243 |
| 5,795,086 | 8/1998 | Watanabe et al. | 400/615.2 |
| 5,860,752 | 1/1999 | Watanabe et al. | 400/615.2 |

FOREIGN PATENT DOCUMENTS

| 55-135963 | 10/1980 | Japan | G06F 15/21 |
|---|---|---|---|
| 56-103780 | 8/1981 | Japan | B41J 15/10 |
| 57-74171 | 5/1982 | Japan | B41J 3/10 |
| 60-71266 | 4/1985 | Japan | B41J 3/10 |
| 60-132769 | 7/1985 | Japan | B41J 3/10 |
| 60-233980 | 11/1985 | Japan | H04N 1/393 |
| 60-247578 | 12/1985 | Japan | B41J 21/00 |
| 61-25370 | 2/1986 | Japan | H04N 1/393 |
| 61-95952 | 5/1986 | Japan | B41J 3/10 |
| 63-25547 | 2/1988 | Japan | B41J 3/28 |
| 63-162256 | 7/1988 | Japan | B41J 3/12 |
| 8-1091 | 1/1996 | Japan | B41J 2/325 |
| 8-52908 | 2/1996 | Japan | B41J 5/30 |
| WO96/16812 | 6/1996 | WIPO |  |

*Primary Examiner*—David K. Moore
*Assistant Examiner*—Douglas Tran
*Attorney, Agent, or Firm*—Lorusso & Loud

[57] ABSTRACT

The present invention relates to a character information printing apparatus for printing a previously inputted character string on a print medium in which at least a transversal dimension is fixed. The apparatus is adapted to introduce instruction information as to a special printing in which, when X print medium portions on which printings are completed are arranged contiguously in the longitudinal and transversal directions thereof, one quasi print resultant having a dimension X times that of each of the print medium portions is obtained. The apparatus includes special printing introducing means for introducing either an operation of performing printing on all the X print medium portions or an operation of performing printing on a part of the print medium portions located in a position specified in the print resultant; print attribute determining means for determining a print attribute, such as character position, with respect to each of the print medium portions; and printing means for printing, when the instruction of performing printing on a part of the print medium portions located in the position thus specified, a character string portion corresponding to the specified position on a print medium in accordance with the print attribute thus determined.

6 Claims, 8 Drawing Sheets a : TAPE WIDTH
b : MAXIMUM PRINT RANGE
c : CHARACTER SIZE
d : FRONT AND REAR MARGINS

CHARACTER INFORMATION PRINTING APPARATUS

BACKGROUND OF THE INVENTION

1. Field of the Invention

The present invention relates to a character information printing apparatus having a function of printing inputted character information on a small print medium. The present invention relates particularly to a tape printing apparatus which is adapted to print inputted character string on a tape.

2. Description of the Related Art

A tape printing apparatus is designed to enable the user to easily prepare a label originated by the user which is to be adhered on, for example, the spine cover of a document file.

A conventional tape printing apparatus has an operation key or the like provided on an operator panel and adapted to input characters so that a desired character string can be previously inputted by operating the operation key. Also, the apparatus also has a tape feeding mechanism so that a tape can be fed and discharged through a tape discharging outlet. Further, the apparatus has a printing mechanism, including a thermal head, and a tape cutting mechanism provided in this order on the path for allowing the tape to be fed.

In the tape printing apparatus, when a print operation key is operated, under the control of control means, the tape is fed at a predetermined speed by the tape feeding mechanism, and a previously inputted character string is printed by the printing mechanism on the tape thus fed. Also, when printing the character string is completed, under the control of the control means, the tape feeding mechanism is further controlled to continue to feed the tape (i.e., to feed the tape without performing printing on the tape) until the printed portion of the tape is positioned outside the apparatus.

After feeding of the tape is completed, the tape is cut by the user with the tape cutting mechanism so that a label originated by the user having thereon a desired character string can be obtained.

Meanwhile, recently available tape printing apparatuses are designed to treat various tape widths, and they almost meet user's needs regarding tape width.

However, in some cases the user needs to obtain a label having a width larger than the maximum width provided by the tape printing apparatus.

An option to meet such a user's need is to provide a tape printing apparatus capable of treating all the possible tape widths wider than the maximum width. However, this option has a disadvantage that it is not economical to construct a tape printing apparatus in which tape widths rarely used are also taken into consideration.

Another option to meet the user's need while solving the disadvantage of the above option is to provide a printing apparatus having a function of enlargement printing. In the enlargement printing, an enlarged character string is printed on a tape, and the tape is divided into N tape portions by cutting the tape along lines perpendicular to the longitudinal direction of the tape. Thereafter, the N tape portions thus obtained are positioned contiguously in the transversal direction thereof (i.e., the tape portions are arranged in such a manner that the tape portions contact with each other in respective longitudinal edges thereof), to thereby obtain a quasi label having a width N times that of the tape loaded in the apparatus and having thereon the enlarged characters thus printed. In the case of, for example, twofold-enlargement printing (i.e., printing in an enlargement multiple of 2) as shown in FIG. 2A, the upper portion MU of an enlarged character string is firstly printed on the tape T, a margin having a predetermined width is formed on the tape, and then the lower portion ML of the enlarged character string is printed.

Incidentally, in a tape printing apparatus designed for mainly preparing a label, in normal printing, upper and lower margins are formed along the longitudinal edges of the tape in order to impart smart appearance. In order to obtain such margins, the print allowable width of the printing head is made smaller than the tape width. Also in the enlargement printing, it is preferred to employ such a configuration as to make the print allowable width of the printing head smaller than the tape width since employing the configuration makes it unnecessary to change the driving mechanism for driving the printing head. When such a configuration as to make the print allowable width smaller than the tape width is also employed in the enlargement printing, the upper and lower margins as shown in FIG. 2A are formed.

After the above-mentioned enlargement printing is completed, the tape T is divided into two tape portions, i.e., the front tape portion T1 and the rear tape portion T2 (see FIG. 2B), the upper and lower margins thus formed during the enlargement printing operation are cut off, and then the tape portions T1 and T2 are positioned contiguously in the transversal direction thereof. Thus, a large label having a width larger than that of the tape is obtained. Incidentally, the label obtained in this manner will be sometimes referred to as "quasi label" hereinafter.

Meanwhile, in the process of obtaining a label (quasi label) through enlargement printing, when the tape portions, each having thereon a divided portion of the enlarged character string, are adhered contiguously in the transversal direction thereof, it is necessary to precisely position them to obtain a satisfactory label.

However, if the tape is long (that is, the tape has an extremely large dimension in only one direction), it is difficult to adhere such a long tape since such a long tape is liable to be distorted or twisted. Accordingly, it is quite difficult to adhere a plurality of tape portions while arranging them at appropriate positions without distorting or twisting them. Consequently, when preparing the quasi label obtained by adhering a plurality of tape portions, each having thereon divided enlarged character strings, the user is liable to mistakenly adhere the tape portions so that the quality of the quasi label becomes unfavorably deteriorated. In the case of enlargement printing, when the user mistakenly adheres the tape portions, a large amount of tape is vainly consumed since even the tape portions successfully adhered need to be printed and adhered again.

Further, in the tape printing apparatus, since the print amount in the longitudinal direction of the tape can be arbitrarily determined, if the allowable number of characters about an inputted text file is set to be large, the print amount in the longitudinal direction of the tape may become very large.

Thus, when adhering a very long tape (label), even though the number of tape is one, the user is liable to mistakenly adhere it at a high probability because the long tape is liable to be distorted or twisted, so that the quality of the adhered label is unfavorably lowered.

Under the above-mentioned circumstances, there is a need for a character information printing apparatus which can easily cure deterioration in print quality occurring in a part of the print resultant, or can prevent quality deterioration in part of the print resultant.

SUMMARY OF THE INVENTION

It is therefore an object of the present invention to provide a character information printing apparatus which can easily cure deterioration in print quality occurring in a part of the print resultant, or can prevent quality deterioration in part of the print resultant.

To achieve the above object, a first aspect of the present invention provides a character information printing apparatus for printing a previously inputted character string on a print medium loaded in the apparatus, the print medium being fixed in at least a transversal dimension thereof, the apparatus including: (1) division printing instructing means for instructing information as to division printing mode in which, when the print medium on which printing is completed is divided into M portions in the longitudinal direction thereof so as to obtain M print medium portions and then the M print medium portions are sequentially positioned in such a manner that the print medium portions contact with each other in respective longitudinal edges thereof, one quasi print resultant having a dimension M times that of each of the print medium portions is obtained; (2) print attribute determining means for determining a print attribute with respect to each of the print medium portions on the basis of a specified value of the M, dimension information of the print medium, and an attribute specified with respect to the character string to be printed; and (3) printing means for sequentially printing character string portions on the respective print medium portions in accordance with the print attribute thus determined, each of the character string portions being obtainable by dividing the character string to be printed into M portions in the longitudinal direction thereof.

Further, a second aspect of the present invention provides a character information printing apparatus for printing a previously inputted character string on a print medium loaded in the apparatus, the print medium being fixed in at least a transversal dimension thereof, the apparatus including: (1) enlargement printing instructing means for instructing information as to enlargement printing mode in which, when the print medium on which printing is completed is divided into M portions in the longitudinal direction thereof so as to obtain M print medium portions and then the M print medium portions are sequentially positioned in such a manner that the print medium portions contact with each other in respective longitudinal edges thereof, one quasi print resultant having a dimension M times that of each of the print medium portions is obtained, and for instructing either an operation of performing printing on all the M print medium portions or an operation of performing printing on a part of the print medium portions located in a position specified in the print resultant; (2)print attribute determining means for determining a print attribute with respect to each of print medium portions on the basis of a specified value of the M, dimension information of the print medium, and an attribute specified with respect to the character string to be printed; and (3) printing means for sequentially printing, when the instruction of performing printing on all the M print medium portions is received from the division printing instructing means, character string portions on the respective print medium portions in accordance with the print attribute thus determined, and for printing, when the instruction of performing printing on a part of the print medium portions located in a position specified in the print resultant is received from the division printing instructing means, a character string portion corresponding to the specified position on the print medium portion in accordance with the print attribute thus determined, each of the character string portions being obtainable by dividing the character string to be printed into M portions in the longitudinal direction thereof.

Further, a third aspect of the present invention provides a character information printing apparatus for printing a pre-viously inputted character string on a print medium loaded in the apparatus, the print medium being fixed in at least a transversal dimension thereof, the apparatus including: (1) enlargement printing instructing means for instructing information as to enlargement printing mode in which, when the print medium on which printing is completed is divided into N portions in the longitudinal direction thereof so as to obtain N print medium portions and then the N print medium portions are sequentially positioned in such a manner that the print medium portions contact with each other in respective transversal edges thereof, one quasi print resultant having a dimension N times that of each of the print medium portions is obtained, and for instructing either an operation of performing printing on all the N print medium portions or an operation of performing printing on a part of the print medium portions located in a position specified in the print resultant; (2)print attribute determining means for determining a print attribute with respect to each of print medium portions and a division position on the basis of a specified value of the N, dimension information of the print medium, and an attribute specified with respect to the character string to be printed; (3) printing means for sequentially printing, when the instruction of performing printing on all the N print medium portions is received from the enlargement printing instructing means, character string portions on the respective printmediumportions in accordance with the print attribute thus determined, and for printing, when the instruction of performing printing on a part of the print medium portions located in a position specified in the print resultant is received from the division printing instructing means, a character string portion corresponding to the specified position on the print medium portion in accordance with the print attribute thus determined, each of the character string portions being obtainable by dividing the character string into N portions in the longitudinal direction thereof.

Further, a fourth aspect of the present invention provides a character information printing apparatus for printing a previously inputted character string on a print medium loaded in the apparatus, the print medium being fixed in at least a transversal dimension thereof, the apparatus including: (1) enlargement-division printing instructing means for instructing information as to enlargement-division printing mode in which, when M×N print medium portions on which printings are completed are arranged in such a manner that M print medium portions are positioned contiguously in the longitudinal direction thereof and N print medium portions are positioned contiguously in the transversal direction thereof, one quasi print resultant having a dimension M×N times that of each of the print medium portions is obtained; (2) print attribute determining means for determining a print attribute with respect to each of print medium portions on the basis of a specified value of the M×N, dimension information of the print medium, and an attribute specified with respect to the character string to be printed; (3) printing means for sequentially printing character string portions on the respective print medium portions in accordance with the print attribute thus determined, each of the character string portions being obtainable by dividing the character string to be printed into M portions in the longitudinal direction thereof and into N portions in the transversal direction thereof.

Further, a fifth aspect of the invention provides a character information printing apparatus for printing a previously inputted character string on a print medium loaded in the apparatus, the print medium being fixed in at least a transversal dimension thereof, the apparatus including: (1) enlargement-division printing instructing means for instructing information as to enlargement-division printing mode in which, when M×N print medium portions on which printings are completed are arranged in such a manner that M print medium portions are positioned contiguously in the longitudinal direction thereof and N print medium portions are positioned contiguously in the transversal direction thereof, one quasi print resultant having a dimension M×N times that of each of the print medium portions is obtained, and for instructing either an operation of performing printing on all the M×N print medium portions or an operation of performing printing on a part of the print medium portions located in a position specified in the print resultant; (2) print attribute determining means for determining a print attribute with respect to each of the print medium portions on the basis of a specified value of the M×N, dimension information as to the print medium, and an attribute specified with respect to the character string to be printed; (3) printing means for sequentially printing, when the instruction of performing printing on all the M×N print medium portions is received, character sting portions on the respective print medium portions in accordance with the print attribute thus determined, and for printing, when the instruction of performing printing on a part of the print medium portions located in the position thus specified, a character string portion corresponding to the specified position on a print medium in accordance with the print attribute thus determined, each of the character string portions being obtainable by dividing the character string to be printed into M portions in the longitudinal direction thereof and into N portions in the transversal direction thereof.

It should be noted that, in the inventions as defined in the appended claims 1 to 6, the term "character string" covers characters, symbols and frames. Also, the term "print attribute" covers positions of characters, lengths of the front and rear margins formed before and after the character string, character sizes, and widths of upper and lower margins.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which.

DETAILED DESCRIPTION OF THE INVENTION

Hereinafter, embodiments of a tape printing apparatus to which the character information printing apparatus according to the present invention is applied will be described with reference to the drawings.

Overall Constitution of Electrical Members in the Embodiment

First, the overall constitution of electrical members in a tape printing apparatuses as an embodiment of a character information printing apparatus according to the present invention will be described with reference to FIG. 3, which is a block diagram showing the function of each element.

Figure 3:
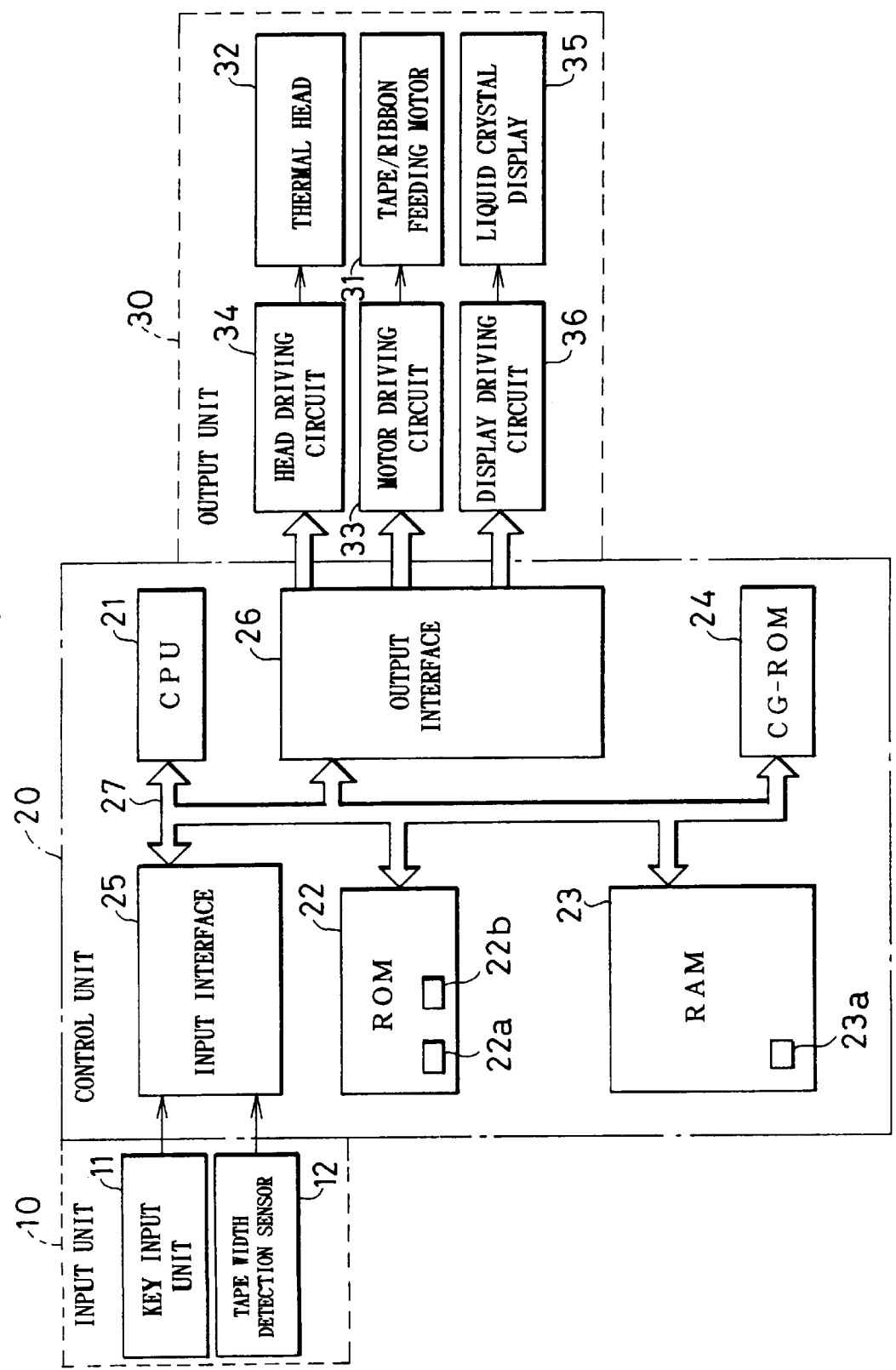
FIG. 3 is a block diagram showing an overall constitution of the electrical members in the tape printing apparatus according to the embodiment of the present invention.

As shown in FIG. 3, similarly to other information processing apparatus, the tape printing apparatus of this embodiment roughly includes an input unit 10, a control unit 20, and an output unit 30. The control unit 20 is adapted to execute processing in accordance with information supplied from the input unit 10, a processing stage at that time, and so on, and the result of the processing is outputted from the output unit 30 by way of display or print.

The input unit 10, while not detailed, includes a key input unit 11 having a depression key, a dial key and the like, and a tape width detection sensor 12. The key input unit 11 is adapted to generate character code data and various types of control data to be supplied to the control unit 20. The tape width detection sensor 12 is adapted to detect the width of the loaded tape and to supply tape width information to the control unit 20. Detecting the tape width by the sensor 12 is conducted by reading a physical identification element (e.g., a hole) provided on a tape cartridge (which accommodates a tape and an ink ribbon) and representing the width of the tape accommodated in the tape cartridge.

The output unit 30 includes members serving as a print mechanism and members serving as a display mechanism.

The output unit 30 includes a tape/ribbon feeding motor 31 and a thermal head 32, both serving as the print mechanism. The tape/ribbon feeding motor 31 is constituted by, for example, a stepping motor and adapted to feed a tape and a ink ribbon loaded in the apparatus (both not shown) to a predetermined printing position or to the outside of the apparatus. The thermal head 32 is, for example, fixed and adapted to perform printing on the running tape by the thermal transferring method. The thermal head 32 have a performance of simultaneously printing, for example, 96 dots at its maximum. The tape/ribbon feeding motor 31 is driven by a motor driving circuit 33, and the thermal head 32 is driven by the head driving circuit 34, both driven under the control of the control unit 20. Cutting of the tape on which printing is completed is performed by, for example, a cutter (not shown) driven by a motor (not shown). Cutting of the tape may be conducted by the user with a cutter driven by the force applied by the user.

In the case of the tape printing apparatus according to this embodiment, the output unit 30 includes a liquid crystal display 35 as the display mechanism. The liquid crystal display 35 is driven by a display driving circuit 36 under the control of the control unit 20 and adapted to directly display an inputted character string, various attribute information, and so on. At the portions lying on the apparatus body and surrounding the display 35, characters representing attributes are printed. Also, in the display 35, indicators for indicating states of the attributes represented by the characters printed on the apparatus body are provided. The states of the attributes are shown by lightening, flashing or lighting-off of the indicators.

The control unit 20 is constituted by, for example, a microcomputer. The control unit 20 includes a CPU 21, a ROM 22, a RAM 23, a character generator ROM (CG-ROM) 24, an input interface 25 and an output interface 26 that are connected via a system bus 27.

The ROM 22 stores various types of processing programs, and fixed data such as dictionary data for kana-kanji conversion. The RAM 23 is used as a working memory and adapted to store fixed data associated with the user input. The RAM 23 is non-volatile to maintain data even while the power is turned off.

The processing programs and the fixed data stored in the ROM 22, and the fixed data stored in the RAM 23 will be detailed later. Incidentally, the ROM 22 also stores a program 22a for enlargement printing operations, and a program 22b for division printing operations, and so on. When the programs 22a and 22b are executed, a working area (print buffer) 23a used for performing such printing operations is appropriately formed in the RAM 23.

The CG-ROM 24 is adapted to store font information of letters and symbols provided in the tape printing apparatus, and to output, when code data for specifying a letter or a symbol are supplied, font information corresponding thereto. The font information stored in the CG-ROM 24 may be either of outline font and bitmap font. Alternatively, the CG-ROM 24 may store font information for display purposes and font information for print purposes, the former and latter font information being different from each other.

The input interface 25 is adapted to interface between the input unit 10 and the control unit 20. The output interface 26 is adapted to interface between the output unit 30 and the control unit 20.

The CPU 21 is adapted to execute a processing program stored in the ROM 22 that is determined in accordance with an input signal sent from the input unit 10 and a processing stage at that time while utilizing the RAM 23 as a working area or, if necessary, appropriately using fixed data stored in the ROM 22 or RAM 23. Also, the CPU 21 is adapted to cause the liquid crystal display 35 to display the state or result of the processing and so on, or causes them to be printed on a tape.

Enlargement Printing Operations in the Embodiment

Figure 2A:
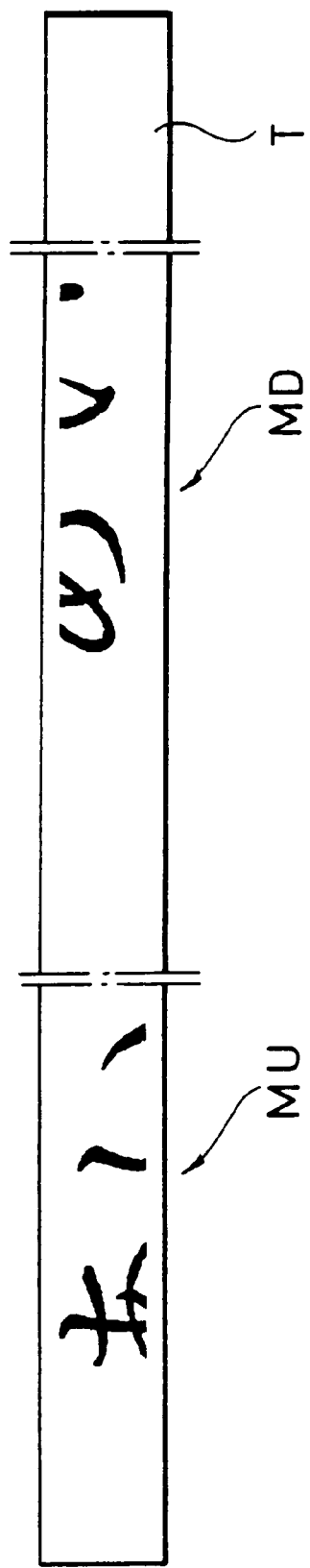
FIGS. 2A and 2B are explanatory views illustrating a problem posed in conventional art.
Figure 2B:
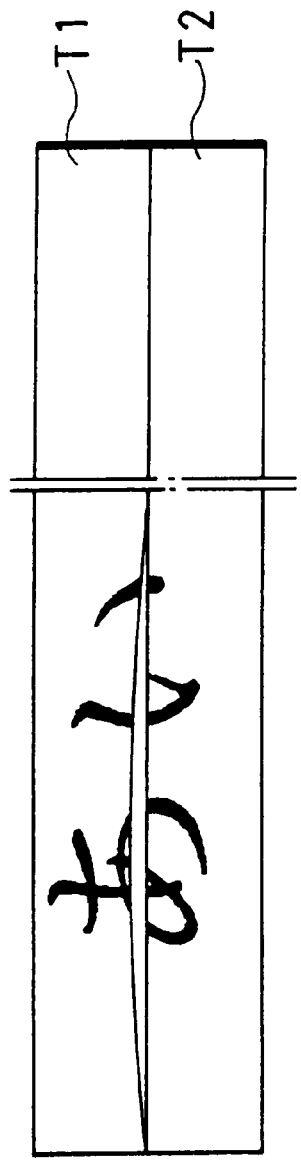

The tape printing apparatus of this embodiment has an enlargement printing function as described above with reference to FIG. 2. The tape printing apparatus of this embodiment is characterized in that part of operations associated with the enlargement printing function is different from those in conventional apparatuses.

In view of the above circumstances, hereinafter operations executed when enlargement printing is designated by the user by operating the key input unit 11 will be described.

Figure 1:
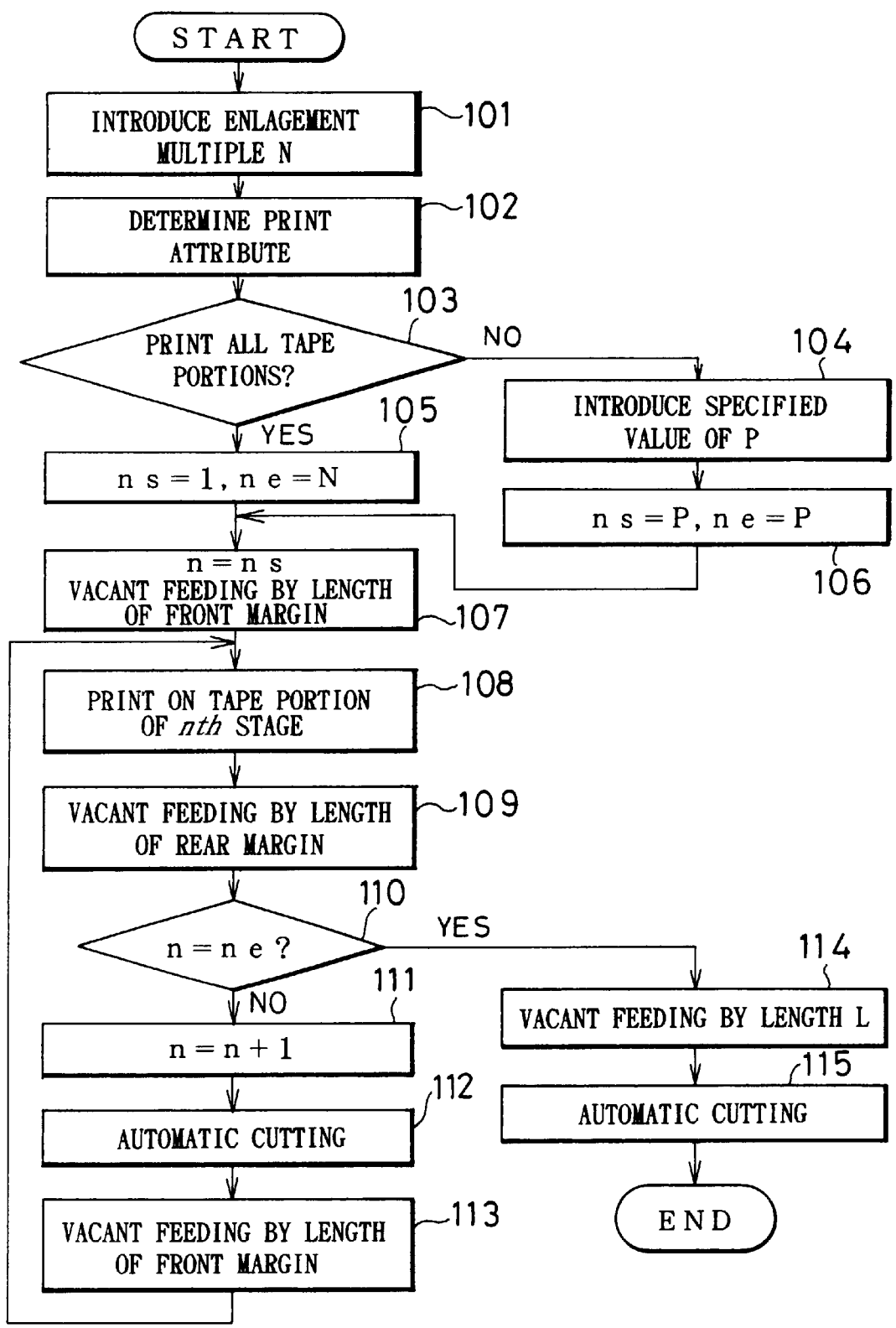
FIG. 1 is a flowchart of enlargement printing processing executed in a tape printing apparatus as an embodiment of a character information processing apparatus of the present invention.

FIG. 1 is a flowchart showing the flow of processing executed in accordance with the program 22a for enlargement printing operations stored in the ROM 22. The CPU 21 executes the program 22a for enlargement printing operations when enlargement printing is designated. In the tape printing apparatus of this embodiment, when printing is designated, for example, in a text input operation mode, the apparatus accepts the designation of printing and thereafter introduces a print type designated by the user. When the print type designated by the user is enlargement printing, the processing shown in FIG. 1 is started.

The CPU 21 firstly causes the liquid crystal display 35 to display a message requesting the user to specify a number representing a multiple of enlargement (hereinafter referred to as "enlargement multiple"), and then introduces the enlargement multiple N inputted by the user through the key input unit 11 in response to the displayed message (step 101). Specification of the enlargement multiple may be performed in such a manner that all options for the enlargement multiple are displayed on the display 35 in the form of a menu and that the user selects a desired enlargement multiple by operating a cursor and an operation key. Alternatively, the specification of the enlargement multiple may be performed in such a manner that a numeral representing a desired enlargement multiple is inputted directly by the user by operating an operation key. When the number of the options for the enlargement multiple to be received by the apparatus is small, for example, when the enlargement multiple is selected out of 2, 3 and 4, the former manner is preferred.

When the enlargement multiple N is specified, the CPU 21 determines print attributes (including front and rear margins, character positions and character sizes) with respect to each tape portion, which is obtained by dividing the tape into N portions in the longitudinal direction thereof by cutting the tape along lines perpendicular to the longitudinal direction of thereof (step 102). Determination of the print attributes is made on the basis of the enlargement multiple N, the tape width of the loaded tape detected by the tape width detection sensor 12, and the attributes specified with respect to the character string to be printed.

In this embodiment, the attributes specified with respect to the character string includes a character size type, a way of providing the front and rear margins, and the length of the tape on which the character string is to be printed. While these attributes are applied to normal printing, these attributes are also applied to enlargement printing in this embodiment.

Figure 4A:
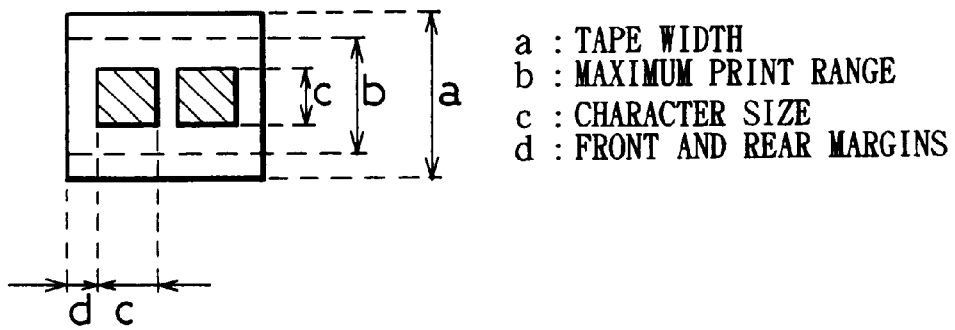
FIGS. 4A, 4B and 4C are explanatory views illustrating how dot data are developed in the enlargement printing in the tape printing apparatus according to the embodiment of the present invention.
Figure 4B:
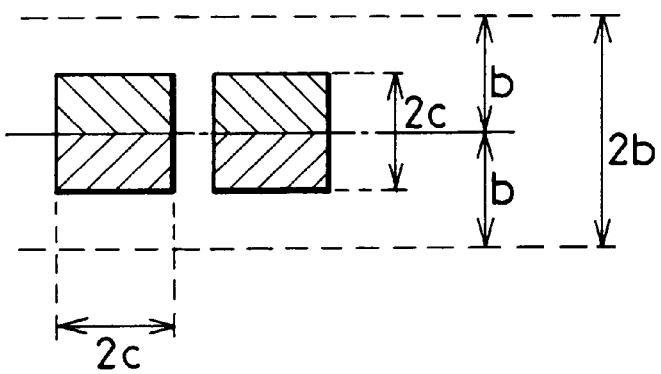
Figure 4C:
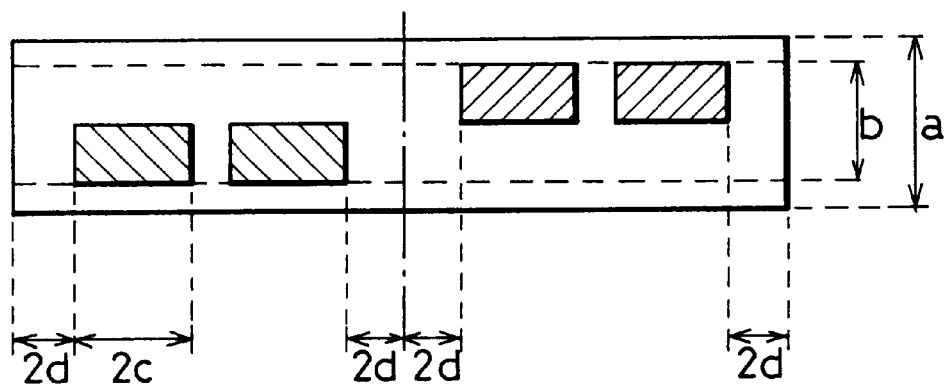

Assume that in normal printing, as shown in FIG. 4A, specific attributes, such as the lengths of the front and rear margins and character positions, are determined on the basis of the width of the loaded tape detected by the tape width detection sensor 12 and the attributes specified with respect to the character string to be printed. On this assumption, if the enlargement multiple N is 2, concrete print attributes, such as front and rear margins and character positions, are determined so that, as shown in FIG. 4B, the enlarged character string printed on the resulting label may have the longitudinal and transversal dimensions two times those of the character string obtained in the normal printing, respectively, and that the characters printed on the tape may be arranged in view of the resulting label as shown in FIG. 4C Thereafter, the CPU 21 causes the liquid crystal display 35 to display a message of requesting the user to specify either an operation of printing on all the tape portions in relation to enlargement printing or an operation of printing on a part of the tape portions associated with Pth stage in relation to enlargement printing, and introduces print amount information specified by the user in response to the displayed message (steps 103 and 104).

Figure 5A:
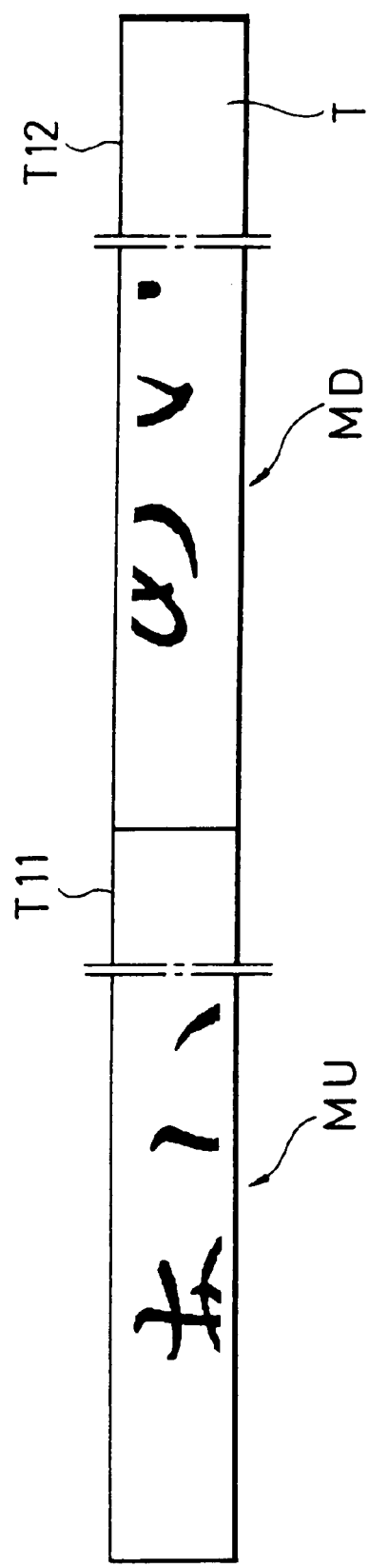
FIGS. 5A and 5B are supplementary explanatory views illustrating enlargement printing in the tape printing apparatus according to the embodiment of the present invention.
Figure 5B:
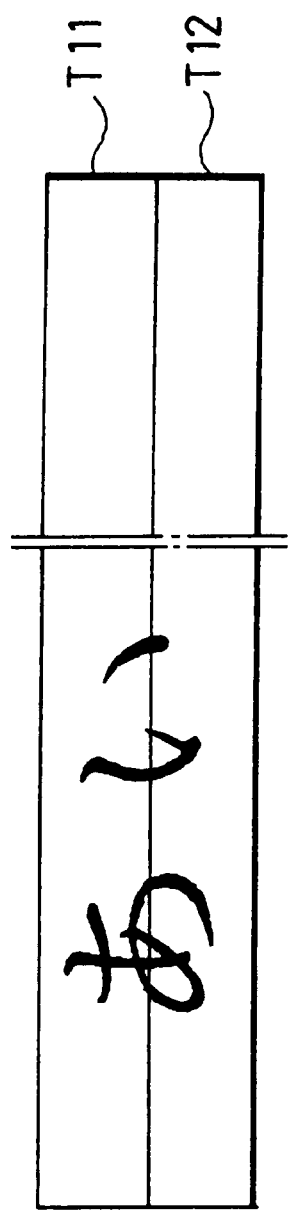

For example, in twofold-enlargement printing as shown in FIGS. 5A and 5B, the print amount information to be introduced is either information as to an operation of printing on both of the two tape portions T1 and T2 simultaneously at this printing operation, or information as to an operation of printing on either of the two tape portions T1 and T2. If the print amount information is the latter information, a tape portion to be subjected to printing is determined by specifying P representing the order (that is, the order counted in the transversal direction of the tape, i.e., from top to bottom of the tape) of the stage associated with the tape portion to be subjected to printing. That is, the tape portion to be subjected to printing is expressed as "tape portion associated with a Pth stage". In twofold-enlargement printing, each tape portion corresponds to half ($\frac{1}{2}$) of the entire resulting label, and P is either of 1 and 2. In threefold-enlargement printing, each tape portion corresponds to one-third ($\frac{1}{3}$) of the entire resulting label, and P is any one of 1, 2 and 3. In N-fold-enlargement printing, each tape portion corresponds to one-Nth (1/N) of the entire resulting label, and P is any one of 1 to N.

When printing on all the tape portions is specified, the CPU 21 sets a print-start-stage-number parameter ns to 1, and also sets a print-end-stage-number parameter ne to N (step 105). On the other hand, when printing on the tape portion associated with a Pth stage is specified, the CPU 21 sets the print-start-stage-number parameter ns to P, and also the print-end-stage number parameter ne to P (step 106).

Thereafter, the CPU 21 proceeds to step 107 and the subsequent steps to perform actual printing operations. Specifically, the CPU 21 firstly sets a parameter n representing the order of a stage associated with the tape portion to be subjected to the printing to a value of ns (1 or P), and also vacantly feeds the tape by the length corresponding to the front margin (see '2d' in FIG. 4C) (step 107).

Next, the CPU 21 gains access to the CG-ROM 24 in accordance with the character code and control code of the character string to be printed, which character code and control code are stored in the RAM 23, and stores the data outputted from the CG-ROM 24 into the print buffer 23a of the RAM 23. Also, the CPU 21 drives the head driving circuit 34 in accordance with the font information stored in the print buffer 23a, to thereby print a character string portion corresponding to the tape portion associated with the nth stage of the resulting label (step 108). Here, the term "character string portion" refers to a portion of the character string previously inputted by the user to be printed on the tape T, which is obtainable by dividing the character string into several portions (in this case, N portions) in the longitudinal direction thereof by cutting along imaginary lines perpendicular to the longitudinal direction thereof. The CPU 21 gains access to the print buffer 23a in accordance with the enlargement multiple N specified by the user, to thereby perform printing on the tape portion associated with the nth stage defined by the parameter n in the enlargement multiple N specified by the user.

When the font information stored in the CG-ROM 24 is bitmap font, the font information is expressed by aggregation of dot data consisting of logical "1" or logical "0" arranged two-dimensionally, that is, in the horizontal and vertical directions.

In normal printing, the font information is developed at a printing position which is formed on the print buffer 23a and defined by a two-dimensional address. Then, and the thermal head 32 is sequentially driven in accordance with the dot data thus developed. In this way, in normal printing, characters are printed at the point number stored in the CG-ROM 24.

In contrast, in enlargement printing, copying of the same dot data is repeated in the horizontal direction, and then copying of the same dot data is repeated in the vertical direction, to thereby obtain N-fold dot data. This procedure is executed when dot data are developed.

In contrast, when the font information stored in the CG-ROM 24 is outline font, an aggregation of dot data consisting of logical "1" or logical "0" arranged two-dimensionally, that is, in the horizontal and vertical directions is obtained on the basis of the enlargement multiple N and outline font information, and the aggregation of the dot data are developed in the print position formed on the print buffer 23a.

Incidentally, in the case where printing is performed on all the tape portions, the apparatus may be constituted in such a manner that firstly development of the dot data is executed with respect to the tape portions associated with all the stages at one time, and thereafter reading-out of dot data for driving the thermal head is executed with respect to a tape portion of each stage by controlling the addresses (see FIG. 4B schematically showing development of data).

Also, in this processing, where printing for vertical writing is designated, when dot data are read out from the CG-ROM 24, the addresses in the horizontal and vertical directions are replaced with each other, and then the read-out data are stored in the print buffer 23a.

Further, when performing printing of a part of the character string, the CPU 21 controls the driving width of the head control circuit 34 in accordance with detection signal supplied from the tape width detection sensor 12 so as to form margins at the top and bottom end portions of the tape T. Also, the CPU 21 causes, when performing printing a part of the character string, the tape T to vacantly proceed between the characters thereof according to necessity, to thereby print the part of the character string at the character spacing set by the user.

After printing of the character string associated with the nth stage is completed in this manner, the CPU 21 causes the tape T to be fed vacantly by a predetermined length so as to form a rear margin at the rear portion of the label (step 109) (see "2d" in FIG. 4C).

Next, the CPU 21 judges whether or not the value of the parameter n coincides with the parameter ne representing the final stage associated with printing (step 110). Making this judgment means verifying whether or not printing on all the tape portions is completed in the case of performing printing on all the tape portions. By contrast, making this judgment means verifying whether or not the printing on the tape portion associated with the Pth stage is completed in the case of performing printing on the tape portion associated with the Pth stage.

For example, assuming that the enlargement multiple is set to 2, where printing on all the tape portion is designated, when only printing on the upper portion MU is completed, a negative judgment is made at step 110, and the CPU 21 proceeds to step 111. By contrast, where printing on the tape portion associated with the Pth stage is designated, a positive judgment is sure to be made at step 110, and then the CPU 21 proceeds to step 114, that is, the processings at the step 111 and its subsequent steps are not executed.

When the CPU 21 proceeds to step 111, the CPU 21 increments the parameter n by 1 and causes the automatic tape cutting mechanism to cut the tape (step 112). Incidentally, where the tape printing apparatus has no automatic tape cutting mechanism, a marker defining a cut line for facilitating user's cutting operation with scissors or the like is provided at step 112 (providing such a marker will be referred to as "quasi cutting").

After completing discharging and cutting (including quasi cutting) of the tape portion on which printing is completed, the CPU 21 causes the tape T to be fed vacantly by a predetermined amount (that is, causes the tape T to be fed by the length of the front margin) and then the CPU 21 returns to step 104 (step 113). Thereafter, the CPU 21 executes printing on a tape portion associated with the next stage.

In the case of performing printing on all the tape portions, the CPU repeats the processing loop consisting of steps 108 to 113. When the CPU 21 completes printing on the tape portion associated with the final stage and proceeds to step 110, a positive judgment is made at step 110. On the other hand, in the case of performing printing on the tape portion associated with the nth stage, a positive judgment is made at step 110 when the CPU 21 proceeds to the step 110 for the first time.

When the positive judgment is made at step 110, the CPU 21 causes the tape T to be vacantly fed by the length L defined between the printing portion of the thermal head 32 (i.e., the place where a heat generating element is provided) and the cutting portion where cutting is performed by the automatic cutting mechanism (step 114). Thereafter, the CPU 21 causes the automatic cutting mechanism to cut the tape, thus completing the enlargement printing processing, and returns to the state assumed when the enlargement printing is designated (step 115). Incidentally, where the tape printing apparatus has no automatic tape cutting mechanism, the step 115 is not executed, and instead the tape will be subjected to cutting by means of the force applied by the user.

With the enlargement printing as described above, the user can perform, by issuing only one instruction of executing enlargement printing, either printing on the tape portions associated with all the stages (see the tape portions T11 and T12 in FIG. 5) or printing on only one tape portion associated with a stage arbitrarily specified (see tape portions T11 or T12 in FIGS. 5A and 5B).

Division Printing Operations in the Embodiment

The tape printing apparatus of this embodiment has division printing function as a printing function, which is not provided in conventional tape printing apparatuses.

Figure 6A:
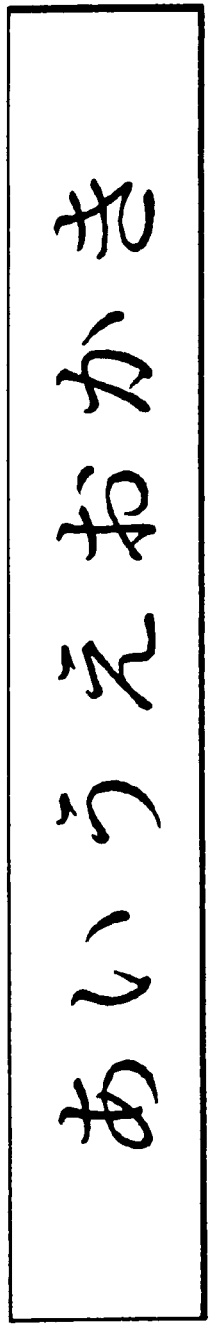
FIGS. 6A and 6B are explanatory views schematically illustrating division printing function in the embodiment of the present invention.
Figure 6B:
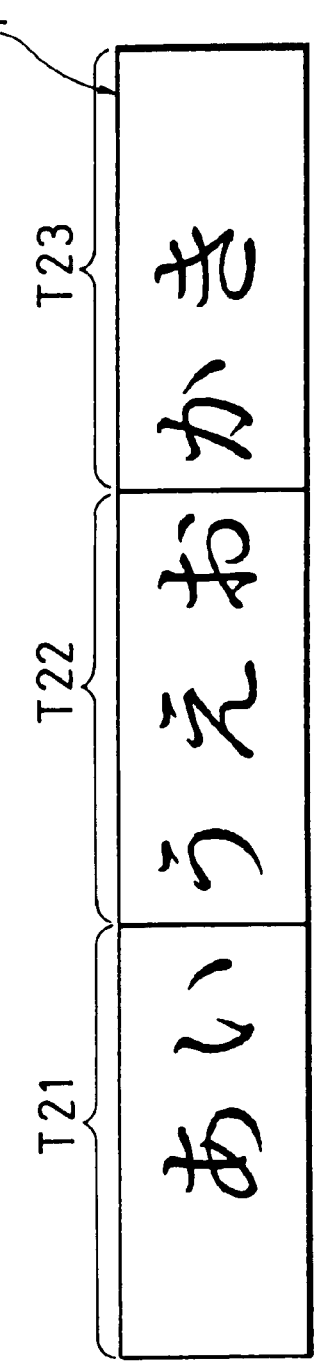

Referring to FIGS. 6A and 6B, division printing function will be described.

In operations of normal printing, as shown in FIG. 6A, after a front margin is formed in the longitudinal direction of a tape, an inputted character string (in some cases, the character string consists of a plurality of lines) is simply printed (i.e., printed without being subjected to any special operations). After the entire character string is printed, a rear margin is formed, and then the tape is cut automatically or manually. In this manner, a resulting label is obtained.

The length of the label is determined on the basis of, for example, the number of characters of the line containing the largest number of characters, a character size and so on. When the label is extremely long, it is difficult to adhere it satisfactorily.

In view of the above circumstances, there is offered a division printing function of obtaining a resulting label by positioning M tape portions contiguously in the longitudinal direction of the tape, as shown in FIG. 6B. According to the division printing function, a plurality of short tape portions, which are easy to adhere, are adhered so that a long label can be obtained.

Hereinafter, the operations performed when division printing is designated by the user by operating the key input unit 11 will be described.

Figure 7:
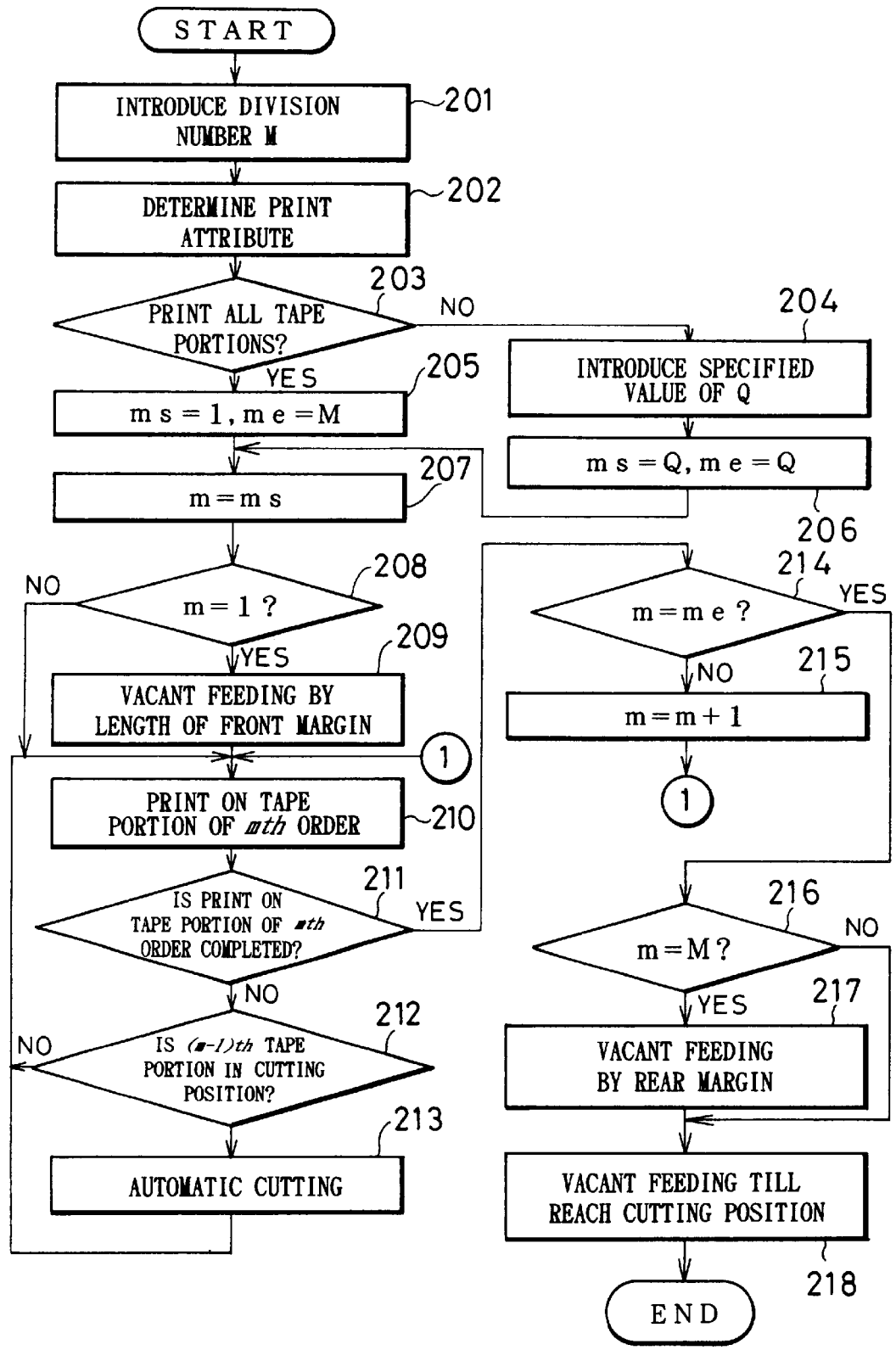
FIG. 7 is a flowchart of division printing processing executed in a tape printing apparatus according to the embodiment of the present invention.

FIG. 7 is a flowchart showing a sequence of processing contained in the program 22b prepared for division printing operations stored in the ROM 22. The program 22b prepared for the division printing operations is executed by the CPU 21 when division printing is designated. In the tape printing apparatus of this embodiment, when printing is designated, for example, in a text input operation mode, the apparatus accepts the designation of printing, and thereafter introduces a print type designated by the user. When the designated print type is division printing, the processing as shown in FIG. 7 is started.

The CPU 21 firstly causes the liquid crystal display 35 to display a message for requesting the user to specify the number of tape portions obtained by dividing the tape (hereinafter, referred to as "division number"), and introduces the division number M inputted by the user by operating the key input unit 11 in response to the displayed message (step 201). Specification of the division number may be performed in such a manner that all division numbers are displayed on the display 35 in the form of a menu and that the user selects a desired division number by operating a cursor and an operation key. Alternatively, the specification of the division number may be performed in such a manner that a numeral representing a desired division number is inputted by the user directly by operating an operation key. When the number of the options for the division number to be received by the apparatus is small, for example, when the division number is selected out of 2, 3 and 4, the former manner is preferred.

When the division number M is specified, the CPU 21 determines print attributes (including character positions and character sizes) with respect to each tape portion. Each tape portion is obtainable by dividing the tape into M portions in the longitudinal direction thereof by cutting the tape along lines perpendicular to the longitudinal direction of the tape as shown in FIG. 6B. Determination of the print attributes is made on the basis of the division number M, the tape width of the loaded tape detected by the tape width detection sensor 12, and attributes specified with respect to the character string to be printed (step 202). The print attributes determined at this occasion are the same as those obtained in the normal printing without performing the division printing as shown in FIG. 6A, except that positions for division must be provided.

Thereafter, the CPU 21 causes the liquid crystal display 35 to display a message of requesting the user to specify either an operation of printing all the tape portions associated with division printing or an operation of printing a part of the tape portions associated with division printing (a tape portion associated with a Qth stage), and introduces print amount information specified by the user in response to the displayed message (steps 203 and 204).

For example, in three-division printing as shown in FIG. 6B, the print amount information to be introduced is either information as to an operation of printing all the three tape portions T21, T22 and T23 simultaneously at this printing operation, or information as to an operation of printing any one of the three tape portions T21, T22 and T23. If the print amount information is the latter information, a tape portion to be subjected to printing is determined by specifying Q representing the order (the order counted from left to right of the tape shown in FIG. 6B) associated with the tape portion to be subjected to printing. That is, the tape portion to be subjected to printing is expressed as a tape portion of a Qth order. In three-division printing, each tape portion corresponds to one-third (⅓) of the entire resulting label, and P is any one of 1, 2 and 3. In M-division printing, each tape portion corresponds to one-Mth of the entire resulting label, and P is any one of 1 to M.

When printing on all the tape portions is designated, the CPU 21 sets the print-start-portion parameter ms to 1, and also sets the print-end-portion parameter me to M (step 205). On the other hand, when the printing on the tape portion of a Qth order is designated, the CPU 21 sets the print-start-portion parameter ms to Q, and also the print-end-portion parameter me to Q (step 206).

Thereafter, the CPU 21 proceeds to step 207 and the subsequent steps to perform actual printing operations. Specifically, the CPU 21 firstly sets a parameter m representing the order of the tape portion to be subjected to the printing to a value of ms (1 or Q), and thereafter judges whether or not the parameter m is 1 (steps 207 and 208). When a positive judgment is made at step 208, the tape is vacantly fed by the length of a front margin (step 209). The processing executed at steps 208 and 209 are provided because only the first tape portion needs to be provided with a front margin as shown in FIG. 6B.

Next, the CPU 21 gains access to the CG-ROM 24 in accordance with the character code and control code of the character string to be printed, which character code and control code are stored in the RAM 23, and stores the data outputted from the CG-ROM 24 into the print buffer 23a of the RAM 23. Also, the CPU 21 drives the head driving circuit 34 in accordance with the font information stored in the print buffer 23a, to thereby cause a character string portion corresponding to the mth tape portion to be printed on the tape T (step 210). Incidentally, in this case, the character string portion is obtainable by dividing the character string into M portions.

In the process of division printing, it is verified whether or not printing of the character string portion corresponding to the mth tape portion is completed (step 211). Also, it is verified whether or not, as a result of the tape feeding operation accompanying the printing operation, the rear end of the (m-1)th tape portion reaches the position where the automatic cutting mechanism is provided (step 212). When, as a result of the tape feeding accompanying the printing, the rear end of the (m-1)th tape portion reaches the position where the automatic cutting mechanism is provided, the tape is automatically cut (step 213). Incidentally, in the case of a tape printing apparatus having no automatic cutting mechanism, the processing to be executed at step 213 is replaced by, for example, a sequence of processing including stopping the tape, displaying a message for requesting the user to cut the tape with a manual cut mechanism, and resuming print processing when it is detected, by a sensor provided in relation to the manual cutting mechanism, that the tape is cut.

When printing the portion of the character string corresponding to the mth tape portion is completed, the CPU 21 judges whether or not the value of the parameter m coincides with the parameter me representing the final tape portion to be subjected to printing (step 214). In the case of performing printing on all the tape portions, making this judgment means verifying whether or not printing on all the tape portions is completed. By contrast, in the case of performing printing on the Qth tape portion, making this judgment means verifying whether or not printing on the Qth tape portion is completed.

When a negative judgment is made at step 214, the CPU 21 increments the parameter m by 1 (step 215), and returns to the above-mentioned step 210 to cause the next tape portion to be printed.

When printing of the character string is completed on all the tape portions (Q or 1) and a positive judgment is made at step 214, the CPU 21 judges whether or not the parameter m is set to M (step 216). That is, it is judged whether or not the finally printed tape portion is the tape portion of the final order. When the finally printed tape portion is judged to be a tape portion of the final order, the CPU 21 causes the tape T to vacantly proceed by the length of the rear margin (step 217). The processings executed at steps 216 and 217 are provided for forming the rear margin on the final tape portion since only the final tape portion needs to have a rear margin as shown in FIG. 6B.

Thereafter, the CPU 21 causes the tape T to vacantly proceed until the rear end of the final tape portion reaches the cutting position where cutting is performed by the automatic cutting mechanism, and then causes the automatic cutting mechanism to cut the tape T, thus completing the sequence of the division printing processing, and then returns to the state taken when the division printing is designated (step 218). Incidentally, in the case of a tape printing apparatus having no automatic cutting mechanism, after the tape is vacantly fed, the tape is ready for cutting by the force applied by the user.

Advantages of the Embodiment

According to the apparatus of the above-mentioned embodiment, with respect to the enlargement printing function, such advantages as described below can be obtained.

In the apparatus of this embodiment, even though the user mistakenly adheres some of the tape portions, when adhering tape portions to form a label associated with enlargement printing, he can print only one substitute tape portion corresponding to the mistakenly adhered tape portion under one print instruction. Therefore, the user can easily cure the mistake in adhering. Also, the amount of the tape consumed to cure the mistake in adhering can be reduced to the minimum. In other words, according to this embodiment, useless printing can be prevented. By contrast, in a conventional tape printing apparatus, to cure the mistakenly adhered label, all the tape portions must be printed and adhered again, that is, the printing performed on the satisfactorily adhered tape portion is in vain.

Further, in this embodiment, the user can perform printing on one tape portion of an arbitrary stage by issuing one instruction of enlargement printing. Accordingly, the user can easily prepare a quasi label having a plurality of different colors mixedly arranged, which can effectively appeal to the viewer's eyes, by changing the color of the loaded tape each time he performs printing on a tape portion. By contrast, if such a quasi label having a plurality of colors mixedly arranged is prepared by employing the conventional enlargement function of printing all the tape portions at one time, many vainly consumed tape portions are unfavorably produced.

According to the above-mentioned enlargement, such advantages as described below can be obtained with respect to the division printing function.

When a division printing function is applied to a label, which becomes long when obtained by using a normal printing function, the tape can be divided into a plurality of tape portions, each of which is short enough to easily adhere, so that mistakes in adhering the tape portions can be reduced.

Further, in division printing, if the user should mistakenly adhere one of the tape portions, he can cure the mistake in adhering by only performing printing on a tape portion corresponding to the mistakenly adhered tape portion.

Further, in the division printing, the user can perform printing on one tape portion of an arbitrary position by issuing one instruction of division printing. Accordingly, the user can easily prepare a label having a plurality of different colors mixedly arranged, which can effectively appeal to the viewer's eyes, by changing the color of the loaded tape each time he performs printing on a tape portion.

Other Embodiments

In the above-mentioned embodiments, both in the enlargement printing and in the division printing, all the tape portions are specified at one time, or one tape portion is specified at one time. However, two or more tape portions may be specified at one time.

Figure 8:
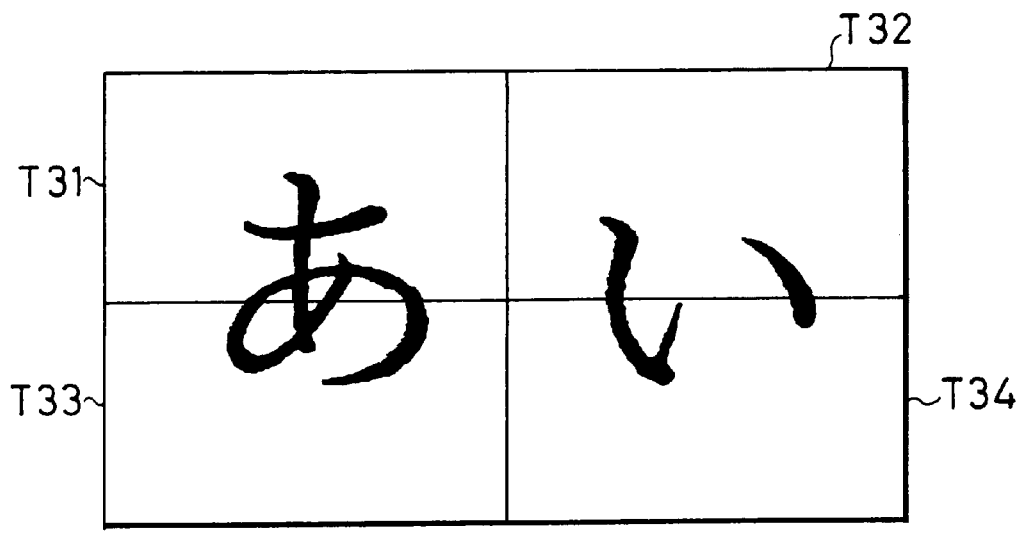
FIG. 8 is an explanatory view illustrating another embodiment of a character information processing apparatus of the present invention.

Further, in the above-mentioned embodiment, as a printing function, which is used for performing printing on a plurality of tape portions to be formed into a label, enlargement printing function and division printing function, each executed independently, are provided. However, a printing function obtained by mixing the enlargement printing function and the division printing function (hereinafter referred to as "enlargement-division printing function") may be employed. If the enlargement-division printing function is employed, the resulting label takes, for example, an arrangement as shown in FIG. 8. According to the arrangement as shown in FIG. 8, the label is composed of the tape portions T31, T32, T33 and T34 positioned contiguously in the longitudinal and transversal directions. The processing executed in the enlargement-division function can be obtained by applying the processing executed under the division printing function as shown in FIG. 7 to the printing processing executed at each stage of the print processing as shown in FIG. 1.

Figure 9A:
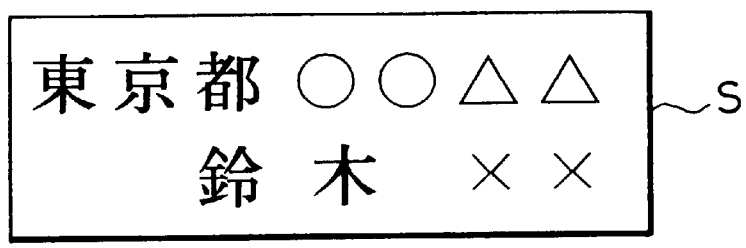
FIGS. 9A, 9B and 9C are explanatory views showing that the present invention is applicable to a seal producing apparatus.
Figure 9B:
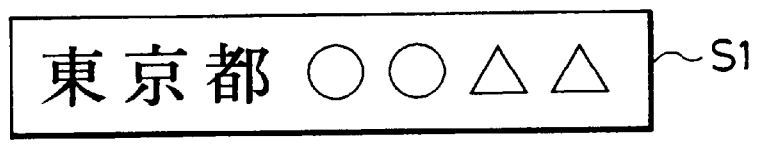
Figure 9C:
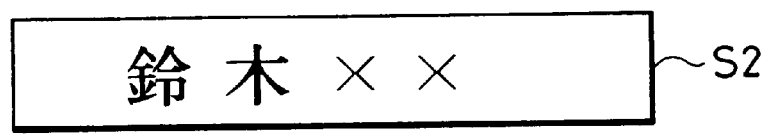

Further, in the above-mentioned embodiment, the present invention is applied to a tape printing apparatus. However, the present invention can be applied to a seal producing apparatus. When the present invention is applied to a seal producing apparatus, in addition to normal transfer processing, in which two lines of character string are transferred (in the appended claims, the term "print" is used) on one large seal S as shown in FIG. 9A, designation of partial transfer is made possible in which the two lines of the character string are separately transferred to small seals S1 and S2, each having a dimension half that of the large seal S.

Advantages of the Invention

As described above, in the character information printing apparatus according to the first aspect of the present invention, there is provided a division printing function of obtaining, when M print medium portions on which printings are completed are positioned contiguously in the longitudinal direction thereof, one quasi print resultant having a dimension M times that of each print medium portion. Accordingly, by utilizing this function, quality deterioration occurring in a part of the print resultant can be prevented.

In the apparatus of the second aspect of the present invention, even though the user mistakenly adheres some of the print medium portions when adhering print medium portions to form a print resultant consisting of M print medium portions, he can print only one substitute print medium portion corresponding to the mistakenly adhered print medium portion under one print instruction. Therefore, the user can easily cure the mistake in adhering. Also, useless printing performed on the print medium can be prevented. Further, since the user can perform printing on one print medium portion of an arbitrary stage by issuing one instruction of division printing, he can easily prepare a quasi print resultant having a plurality of different colors mixedly arranged, which can effectively appeal to the viewer's eyes, by changing the color of the loaded print medium each time he performs printing on a print medium portion.

According to the character information printing apparatus of the third aspect of the present invention, since only one print medium portion of an arbitrary stage can be printed, if the user should mistakenly adhere one of the print medium portions, he can cure the mistake in adhering by only performing printing on a print medium portion corresponding to the mistakenly adhered print medium portion. Also, the user can easily prepare a print resultant having a plurality of different colors mixedly arranged, which can effectively appeal to the viewer's eyes, by changing the color of the loaded print medium each time he performs printing on a print medium portion.

Further, in the character information printing apparatus according to the fourth aspect of the present invention, there is provided an enlargement-division printing function of obtaining, when M×N print medium portions, on which printing is completed, are arranged in such a manner that M print medium portions are positioned contiguously in the longitudinal direction and N print medium portions are positioned contiguously in the transversal direction, one quasi print resultant having a dimension M ×N times that of each print medium portion. By using this function, quality deterioration at a part of the print resultant can be prevented, and also the user can obtain a quasi print resultant having a transversal dimension larger than that of the print medium.

Further, in the character information printing apparatus according to the fifth aspect of the present invention, there is provided an enlargement-division printing function of obtaining, when M×N print medium portions, on which printings are completed, are arranged in such a manner that M print medium portions are positioned contiguously in the longitudinal direction and N print medium portions are positioned contiguously in the transversal direction, one quasi print resultant having a dimension M ×N times that of each of the print medium portions. In a case of effecting the enlargement-division printing function, there is further provided a printing function of performing printing only on a part of print medium portions located in a specified position in the print resultant. Accordingly, even when quality deterioration occurs in a part of the print resultant, the user can cure the quality deterioration by performing printing on the part of the print medium portion.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A character information printing apparatus for printing a previously inputted character string on a tape loaded in said apparatus, the tape being fixed in at least a transversal dimension thereof, said apparatus comprising:

division printing instructing means for instructing information as to a division printing mode in which, when the printing of the character string is completed, the printed tape with tht printed character string is divided into M portions in the longitudinal direction thereof so as to obtain M tape portions and then the M tape portions are sequentially positioned in such a manner that the tape portions contact with each other at respective edges which are transverse to the longitudinal direction of the printed tape to produce a quasi print resultant having a longitudinal dimension equal to the sum of the longitudinal dimensions of the tape portions;

print attribute determining means for determining print attributes including setting positions for cutting the tape with respect to each of the tape portions on the basis of a specified value of the M, dimension information of the tape, and an attribute specified with respect to the character string to be printed; and printing means for sequentially printing character string portions on the respective tape portions in accordance with the print attributes thus determined, each of the character string portions being obtainable by dividing the character string to be printed into M portions in the longitudinal direction thereof.

2. A character information printing apparatus for printing a previously inputted character string on a tape loaded in said apparatus, the tape being fixed in at least a transversal dimension thereof, said apparatus comprising:

division printing instructing means for instructing information as to a division printing mode in which, when the printing of the character string is completed, the printed tape with the character string is divided into M portions in the longitudinal direction thereof so as to obtain M tape portions and then the M tape portions are sequentially positioned in such a manner that the tape portions contact with each other at respective edges which are transverse to the longitudinal direction of the printed tape to produce a quasi print resultant having a dimension equal to the sum of the tape portions;

said division printing instruction means having two independently selectable instruction modes, one instruction mode for instructing an operation of performing printing on all the M tape portions and the other instruction mode for an operation of performing printing on only a part of the tape portions located in a position specified in the print resultant;

print attribute determining means for determining a print attribute with respect to each of tape portions on the basis of a specified value of the M, dimension information of the tape, and an attribute specified with respect to the character string to be printed; and printing means for sequentially printing, when the instruction of performing printing on all the M tape portions is received from said division printing instructing means, character string portions on the respective tape portions in accordance with the print attribute thus determined, and for printing, when the instruction of performing printing on a part of the tape portions located in a position specified in the print resultant is received from said division printing instructing means, a character string portion corresponding to the specified position on the tape in accordance with the print attribute thus determined, each of the character string portions being obtainable by dividing the character string to be printed into M portions in the longitudinal direction thereof.

3. A character information printing apparatus for printing a previously inputted character string on a tape loaded in said apparatus, the tape being fixed in at least a transversal dimension thereof, said apparatus comprising:

enlargement printing instructing means for instructing information as to enlargement printing mode in which, when the tape on which printing is completed the tape is divided into N portions in the longitudinal direction thereof so as to obtain N tape portions and then the N tape portions are sequentially positioned in such a manner that the tape portions contact with each other at respective longitudinal edges thereof to produce a quasi print resultant having a dimension in the transfersal direction N times that of each of the tape portions;

said enlargement printing instruction means having two instruction modes, one instruction mode for instructing either an operation of performing printing on all the N tape portions and the other instruction mode for an operation of performing printing on only a part of the tape portions located in a position specified in the print resultant;

print attribute determining means for determining a print attribute with respect to each of tape portions and a division position on the basis of a specified value of the N, dimension information of the tape, and an attribute specified with respect to the character string to be printed;

printing means for sequentially printing, when the instruction of performing printing on all the N tape portions is received from said enlargement printing instructing means, character string portions on the respective tape portions in accordance with the print attribute thus determined, and for printing, when the instruction of performing printing on a part of the tape portions located in a position specified in the print resultant is received from said division printing instructing means, a character string portion corresponding to the specified position on the tape in accordance with the print attribute thus determined, each of the character string portions being obtainable by dividing the character string into N portions in the longitudinal direction thereof.

4. A character information printing apparatus for printing a previously inputted character string on a tape loaded in said apparatus, the tape being fixed in at least a transversal dimension thereof, said apparatus comprising:

enlargement-division printing instructing means for instructing information as to enlargement-division printing mode in which, when printing of the character string on the tape is completed and the tape is divided into M×N tape portions, the M×N tape portions are arranged in such a manner that M tape portions are positioned contiguously in the longitudinal direction of the tape and N tape portions are positioned contiguously in the transversal direction of the tape to produce a quasi print resultant having a dimension M×N times that of each of the tape portions;

print attribute determining means for determining print attributes including setting positions for cutting the tape with respect to each of tape portions on the basis of a specified value of the M×N, dimension information of the tape, and an attribute specified with respect to the character string to be printed;

printing means for sequentially printing character string portions on the respective tape portions in accordance with the print attribute thus determined, each of the character string portions being obtainable by dividing the character string to be printed into M portions in the longitudinal direction thereof and into N portions in the transversal direction thereof.

5. A character information printing apparatus for printing a previously inputted character string on a tape loaded in said apparatus, the tape being fixed in at least a transversal dimension thereof, said apparatus comprising:

enlargement-division printing instructing means for instructing information as to an enlargement-division printing mode in which, when printing of the character string on the tape is completed and the tape is divided into M×N tape portions, the M×N tape portions are arranged in such a manner that M tape portions are positioned contiguously in the longitudinal direction of the tape and N tape portions are positioned contiguously in the transversal direction of the tape to produce a quasi print resultant having a dimension M×N times that of each of the tape portions;

said enlargement-division printing means having two independently selectable instruction modes, one instruction mode for instructing an operation of performing printing on all the M×N tape portions and the other instruction mode for an operation of performing printing on only a part of the tape portions located in a position specified in the print resultant;

print attribute determining means for determining a print attribute with respect to each of the tape portions on the basis of a specified value of the M×N, dimension information as to the tape, and an attribute specified with respect to the character string to be printed;

printing means for sequentially printing, when the instruction of performing printing or all the M×N tape portions is received, character string portions on the respective tape portions in accordance with the print attribute thus determined, and for printing, when the instruction of perfoming printing on a part of the tape portions located in the position thus specified, a character string portion corresponding to the specified position on a tape in accordance with the print attribute thus determined, each of the character string portions being obtainable by dividing the character string to be printed into M portions in the longitudinal direction thereof and into N portions in the transversal direction thereof.

6. A character information printing apparatus according to claim 4, wherein said print attribute determining means determines an attribute with respect to each of said tape portions in such a manner that said quasi print resultant has a character size N times that obtained in normal printing, a length of a front margin N times that obtained in normal printing, a length of a rear margin N times that obtained in normal printing, the front and rear margins being formed before and after the character string, respectively, and that each of the tape portions has a top margin and a bottom margin.

* * * * *

UNITED STATES PATENT AND TRADEMARK OFFICE
CERTIFICATE OF CORRECTION

PATENT NO.   : 6,134,016
DATED        : October 17, 2000
INVENTOR(S)  : Watanabe et al.

It is certified that error appears in the above-identified patent and that said Letters Patent is hereby corrected as shown below:

Title page,
Under the heading "Inventors", "Takeshi Hosokawa, both of Suwa," should read -- Takeshi Hosokawa, both of Nagano --.

Column 4,
Line 26, "printmediumportions" should read -- print medium portions --.

Column 5,
Line 20, "sting" should read -- string --.

Column 6,
Line 49, "a" should read -- an --; and
Line 54, "have" should read -- has --.

Column 8,
Line 40, "includes" should read -- include --.

Column 17,
Line 9, "tht" should read -- the --.

Column 18,
Line 18, "transfersal" should read -- transversal --.

Column 20,
Line 7, "or" should read -- on --.

Signed and Sealed this

Twenty-second Day of January, 2002

Attest:

JAMES E. ROGAN
Attesting Officer
Director of the United States Patent and Trademark Office